Figure 1:
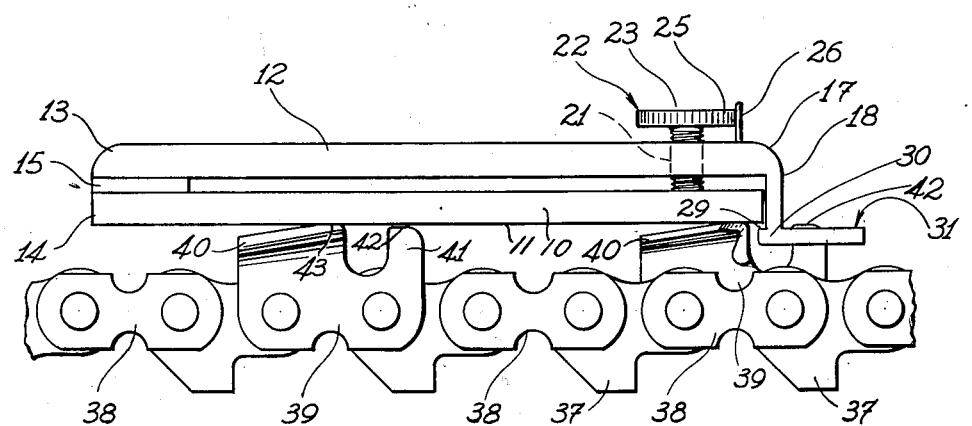

Dec. 23, 1952   J. B. COX   2,622,338
FILING GAUGE
Filed Sept. 10, 1951

INVENTOR.
JOSEPH B. COX
BY
Buckhorn and Cheatham
ATTORNEYS

Patented Dec. 23, 1952

2,622,338

UNITED STATES PATENT OFFICE 2,622,338

FILING GAUGE

Joseph B. Cox, Portland, Oreg., assignor to Oregon Saw Chain Corporation, Portland, Oreg., a corporation of Oregon Application September 10, 1951, Serial No. 245,913

5 Claims. (Cl. 33—202)

This invention relates to a gauging device and more particularly to a filing gauge adapted for use in adjusting the clearance of the depth gauge of a saw chain tooth.

In a saw chain of the type having a plurality of cutting teeth with a portion having cutting edges formed thereon at right angles to the plane of the saw chain, there is generally provided a depth gauge for each of the teeth to ride the bottom and regulate the depth of the cut of each tooth. For maximum efficiency it is desirable that the depth of cut be accurately controlled. If the cut is too shallow efficiency is obviously decreased whereas if the cut is too deep the tooth has a tendency to grab, which causes rough operation of the saw and in some instances will result in stalling of the saw chain in the cut.

In most of the saw chains used today the cutting edge of the tooth is formed on a toe portion extending substantially at right angles to the plane of the tooth and slanting downwardly to the rear of the tooth. As the cutting edge is sharpened, the vertical distance or clearance between the cutting edge and the top of the depth gauge will decrease. It is necessary, therefore, that the clearance of the depth gauge be checked each time the saw tooth is sharpened and the depth gauge filed off if there is insufficient clearance between the cutting edge and the depth gauge. Since it frequently happens that a saw chain must be sharpened while logging in remote areas inaccessible to well-equipped machine shops, it is necessary that the sawyer carry with him some gauging device whereby he may readily maintain the proper clearance of the depth gauges of the saw chain with which he is working. Such a gauge should, of course, be compact and rugged in construction to withstand the abuse subjected to tools carried in a small hand tool box as they carry.

It is, then, an object of this invention to provide a compact, rugged filing gauge for use in adjusting the clearance of the depth gauge of a saw chain tooth.

It is a further object of this invention to provide a filing gauge for use in attaining rapid and accurate adjustment of the clearance of the depth gauge of a saw chain tooth.

It is a still further object of this invention to provide a filing gauge for a saw chain tooth depth gauge which requires little or no maintenance.

Other objects and advantages of this invention will become apparent as the following description proceeds.

In accordance with the illustrated embodiments of the present invention there is provided a filing gauge having a portion adapted to rest upon the cutting edges of the teeth of a chain saw, with an adjustable filing shoe operatively connected to said portion and having an opening for receiving a depth gauge of the saw chain. Further means are provided for adjusting the distance between the surface of the filing shoe and the aforementioned portion.

Figure 2:
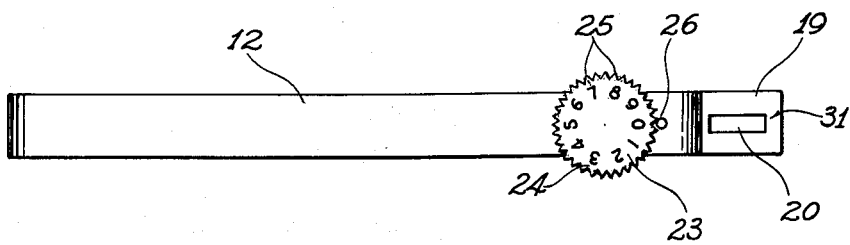

In the drawings:

Fig. 1 is a side elevation of the filing gauge of this invention placed on a saw chain in the position of its use; and Fig. 2 is a plan view of the filing gauge.

The filing gauge of this invention is particularly adapted for use in filing the depth gauge of a saw chain tooth of the type having a cutting edge defining portion extending in a direction at right angles to the plane of the saw chain. Shown in Fig. 1 is a specific form of a chain of this type. The saw chain pictured therein comprises a plurality of centrally disposed sprocket-engaging links 37 pivotally joined together by means of pairs of oppositely-disposed side plates 38 and 39. Side plates 38 are identical to each other, whereas side plates 39 have a toe portion 40 extending across the chain at right angles to the plane of the plates 38 with a cutting edge 43 formed thereon. Also formed on plate 39 and spaced ahead of the cutting edge 43 is a depth gauge or rider 41, the surface 42 of which rides on the bottom of the cut, ahead of the tooth. As shown, alternate tooth plates 39 are of right and left configuration. For a further description of this saw chain reference is made to my Patent No. 2,508,784, issued May 23, 1950.

Referring now to the drawings, there is shown therein a filing gauge comprising base portion or plate 10 having a lower planar surface 11. An upper portion or plate 12 is arranged to overlie the base plate 10 and is secured by suitable means at end 13 to end 14 of the base plate with a spacing plate 15 interposed therebetween in such a manner that the opposite end 16 of base plate 10 is normally urged toward the opposite end 17 of upper plate 12.

Depending from end 17 of the upper portion 12 beyond the base portion 10 is an L-shaped member having a shank 18 and a horizontally extending filing shoe 19 provided with a rectangular opening 20 therethrough and having an upper surface 31 formed substantially parallel to the plane of the surface 11 of base plate 10. Also protruding from the shank 18 is a heel 30, the upper surface 29 of which is in the same plane as the surface 31 of shoe 19. The upper surface 29 of heel 30 is adapted to engage the surface 11 of the base plate 10 when the base plate and the upper plate 12 are urged apart at their free ends at about a distance equal to the height of spacing plate 15. Obviously the filing shoe 19 could be made in the form of a bifurcated member adapted to receive the depth gauge between the bifurcations. To prolong the life of the gauge the filing shoe is preferably formed of a very hard metal resistant to wear by filing or provided with a hard surface layer such as chrome on which surface 31 is formed.

To provide means for adjustment, a bore 21 threaded with a pitch of 0.050 inch is provided in the upper plate 12 and is adapted to receive a cooperatively threaded adjustment screw 22, the lower end of which abuts the upper surface of base plate 10. By turning the screw 22 in the bore 21, the length of the projecting portion of the screw can be varied so as to force ends 16 and 17 apart or allow them to draw together as the case may be and consequently obtain control over the vertical distance or clearance between surfaces 11 and 31. To aid in setting the gauge the head 23 of the adjustment screw 22 is provided with ten graduations 24, and fifty notches 25 spaced evenly about the periphery of the head. Casual turning movement of the adjustment screw 22 is restrained by means of a resilient pin 26 mounted in the upper plate adapted to engage the notches 25. This pin 26 also serves as an indicating point to determine the amount of rotation of the screw.

In operation, a saw such as shown moves through the kerf to the right, with the gauging surface 42 of each of the depth gauges 41 riding in the bottom of the kerf formed by the cutting edge 43 of the preceding tooth.

For the reasons previously set forth, it is important that the vertical distance or clearance between the gauging surface 42 of the depth gauge 41 and the cutting edge 43 be maintained at a given distance. This clearance varies depending upon the type of wood being cut and the direction of the cut with regard to the grain, but in any case it is important to maintain the clearance within rigid limits. Probably the most frequent occasion for the use of the gauge of this invention is in adjusting the clearance of the depth gauges after a saw chain tooth has been resharpened. As can be seen, the toe portion 40 on which the cutting edge 43 is formed, gradually slopes in a downward direction to the rear of the tooth so that as the saw chain wears and is resharpened, the vertical distance from the gauging surface 42 of the depth gauge to the cutting edge 43 will be gradually lessened unless the gauging surface 42 is cut away to maintain the desired clearance.

The filing gauge of this invention provides an easy and expedient means for maintaining and adjusting the clearance of a saw chain tooth by using it in the manner illustrated in Fig. 1. As shown therein, the filing gauge is placed upon a length of the saw chain aligned as it would be on the straight portion of a saw bar, so that the bottom surface 11 of the base plate 10 rests upon the cutting edges 43 of two adjacent teeth of the chain, with opening 20 of filing shoe 19 placed over the depth gauge 41 of the forward tooth. With the base plate so placed, the position of the upper surface 31 of filing shoe 19 in relation to the lower surface 11 of the base plate can be regulated by turning the adjustment screw 22 and referring to the graduations 24 and the notches 25. The heel 30 provides a convenient gauging point by turning the adjustment screw until the plates are urged apart to the point where heel 30 engages the surface 11 of base plate 10, there being zero clearance at this point.

If, after adjusting the tool to the clearance it is desired to have in the particular saw being adjusted, it is found that the depth gauge 41 projects above the surface 31 of the filing shoe 19 indicating insufficient clearance in that tooth, the surface 42 may be simply filed off with the tool in place until surface 42 is flush with the surface 31 thereby obtaining the desired clearance. Since adjustment of the distance between surfaces 11 and 31 may be so readily made, it is apparent the tool of this invention is adapted for use in adjusting a plurality of saw chains each having a different clearance.

As is evident from the foregoing description and the drawings, the device of the present invention is easily and cheaply made and is one that requires no maintenance since it has no parts that can get out of adjustment. Furthermore, as seen, accurate and rapid adjustment of the clearance of the depth gauge of a saw tooth is attained through its use.

Having illustrated and described a preferred embodiment of the invention, it should be apparent that the invention permits of modification in arrangement and detail. I claim as my invention all such modifications as come within the true spirit and scope of the appended claims.

I claim:

1. A filing gauge for use in filing the depth gauge of a saw chain tooth while a length of saw chain containing two or more teeth is secured in the position assumed by said chain on the straight portion of a saw bar of a chain saw, said teeth being of the type having a cutting edge defining portion extending in a direction at right angles to the plane of the saw chain and provided with an integral depth gauge spaced ahead of the cutting edge, said filing gauge comprising an elongated base portion having a lower planar surface adapted to be rested on the cutting edges of at least two adjacent saw chain teeth, and an elongated upper portion overlying said base portion, said base and upper portions being secured together at one pair of adjacent ends and being normally urged together at the opposite ends and resiliently separable in a vertical direction at said opposite ends, a substantially L-shaped portion including a shank and a filing shoe depending downwardly from said opposite end of said upper portion beyond the end of said base portion, said shank and filing shoe being of substantial width, said filing shoe having an upper surface substantially parallel to said planar surface of said base portion, an elongated opening in said filing shoe adapted to receive therethrough a depth gauge of one of said teeth, a heel protruding from said shank having an upper surface formed thereon in the plane of the upper surface of said filing shoe adapted to engage said planar surface of said base portion thereby to establish a limit stop and gauging point for said filing gauge, and means for adjusting the vertical distance between said planar surface of said base portion and said upper surface of said filing shoe comprising an adjustment screw cooperatively threaded in said upper portion and abutting the upper surface of said base portion, a head on said screw having graduations marked thereon and evenly notched about the periphery thereof, a stationary resilient element protruding from said upper portion and cooperating with said notches to restrain said screw from casual movement, said graduations and notches being positioned to indicate the distance between said planar surface of said base portion and said upper surface of said filing shoe as said adjustment screw is revolved.

2. A filing gauge for use in filing the depth gauge of a saw chain tooth while a length of saw chain containing two or more teeth is secured in the position assumed by said chain on the straight portion of the saw bar of a chain saw, said teeth being of the type having a cutting edge defining portion extending in a direction at right angles to the plane of the saw chain and provided with an integral depth gauge spaced ahead of the cutting edge, said filing gauge comprising an elongated base portion having a lower planar surface adapted to be rested on the cutting edges of at least two adjacent saw chain teeth, and an elongated upper portion overlying said base portion, said base and upper portions being secured together at one pair of adjacent ends and being normally urged together at the opposite ends and resiliently separable in a vertical direction at said opposite ends, a substantially L-shaped portion including a shank and a filing toe depending downwardly from said opposite end of said upper portion beyond the end of said base portion, said filing shoe having an upper surface substantially parallel to said planar surface of said base portion, an opening in said filing shoe adapted to receive therethrough a depth gauge of one of said teeth, a heel protruding from said shank having an upper surface formed thereon in the plane of the upper surface of said filing shoe adapted to engage said planar surface of said base portion thereby to establish a limit stop and gauging point for said filing gauge, and means for adjusting the vertical distance between said base and upper portions whereby the vertical distance between said planar suface of said base portion and said upper surface of said filing shoe will be varied.

3. A filing gauge for use in filing the depth gauge of a saw chain tooth while a length of saw chain containing two or more teeth is secured in the position assumed by said chain on the straight portion of the saw bar of a chain saw, said teeth being of the type having a cutting edge defining portion extending in a direction at right angles to the plane of the saw chain and provided with an integral depth gauge spaced ahead of the cutting edge, said filing gauge comprising an elongated base portion having a lower planar surface adapted to be rested on the cutting edges of at least two adjacent saw chain teeth, and an elongated upper portion overlying said base portion, said base and upper portions being secured together at one pair of adjacent ends and being normally urged together at the opposite ends and resiliently separable in a vertical direction at said opposite ends, a substantially L-shaped portion including a shank and a bifurcated filing shoe adapted to receive a depth gauge of one of said teeth depending downwardly from said opposite end of said upper portion beyond the end of said base portion, said filing shoe having an upper surface substantially parallel to said planar surface of said base portion, a heel protruding from said shank having an upper surface formed thereon in the plane of the upper surface of said filing shoe adapted to engage said bottom surface of said base portion thereby to establish a limit stop and gauging point for said filing gauge, and means for adjusting the vertical distance between said planar surface of said base portion and said upper surface of said filing shoe.

4. A filing gauge for use in filing the depth gauge of a saw chain tooth while a length of saw chain containing two or more teeth is secured in the position assumed by said chain on the straight portion of the saw bar of a chain saw, said teeth being of the type having a cutting edge defining portion extending in a direction at right angles to the plane of the saw chain and provided with an integral depth gauge spaced ahead of the cutting edge, said filing gauge comprising a base portion having a lower planar surface adapted to be rested on the cutting edges of at least two adjacent saw chain teeth, and an upper portion overlying said base portion and adjustable with respect thereto, a substantially L-shaped portion including a shank and a filing shoe depending downwardly from said upper portion, said filing shoe having an upper surface substantially parallel to said planar surface of said base portion, an opening in said filing shoe adapted to receive therethrough a depth gauge of one of said teeth, a heel protruding from said shank having an upper surface formed thereon in the plane of the upper surface of said filing shoe adapted to engage said planar surface of said base portion thereby to establish a limit stop and gauging point for said filing gauge, and means for adjusting the vertical distance between said planar surface of said base portion and said upper surface of said filing shoe.

5. A filing gauge for use in filing the depth gauges of a saw chain in a chain of the type having teeth having a cutting edge defining portion extending in a direction at right angles to the plane of the saw chain and provided with depth gauges for said teeth, said filing gauge adapted for use while a length of said chain containing two or more teeth is secured in the position assumed by said chain on the straight portion of the saw bar of a chain saw and comprising a base portion having a planar surface adapted to be placed on the cutting edges of at least two adjacent saw chain teeth, an upper portion overlying said base portion and adjustable with respect thereto, a substantially L-shaped portion including a shank and a filing shoe depending from said upper portion, said filing shoe having an upper surface substantially parallel to said planar surface of said base portion, an opening in said filing shoe adapted to receive therethrough a depth gauge of said saw chain, and a heel on said shank adapted to engage said base portion at the maximum separation desired between said upper and said base portion.

JOSEPH B. COX.

No references cited.